US008380487B2

(12) United States Patent     (10) Patent No.: US 8,380,487 B2
Bastide et al.     (45) Date of Patent: Feb. 19, 2013

(54) LANGUAGE TRANSLATION OF SELECTED CONTENT IN A WEB CONFERENCE

(75) Inventors: Paul Roger Bastide, Boxford, MA (US); Robert E. Loredo, North Miami Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 229 days.

(21) Appl. No.: 12/819,625

(22) Filed: Jun. 21, 2010

(65) Prior Publication Data

US 2011/0313754 A1    Dec. 22, 2011

(51) Int. Cl.
    *G06F 17/28*     (2006.01)
    *G06K 9/00*     (2006.01)

(52) U.S. Cl. ............ 704/3; 704/2; 382/182; 715/753; 709/204

(58) Field of Classification Search .......... 704/2, 3, 704/4; 709/204; 715/753; 382/182
See application file for complete search history.

(56) References Cited

U.S. PATENT DOCUMENTS

| | | | |
|---|---|---|---|
| 5,546,449 A * | 8/1996 | Hogan et al. ............ | 379/202.01 |
| 6,341,306 B1 * | 1/2002 | Rosenschein et al. ........ | 709/217 |
| 6,857,022 B1 * | 2/2005 | Scanlan .................. | 709/229 |
| 7,031,906 B2 * | 4/2006 | Shimohata et al. ........... | 704/2 |
| 7,054,804 B2 * | 5/2006 | Gonzales et al. ............ | 704/8 |
| 7,089,559 B2 * | 8/2006 | Redpath ................... | 718/106 |
| 7,197,535 B2 | 3/2007 | Salesky et al. | |
| 7,451,181 B2 * | 11/2008 | Sasaki et al. .............. | 709/204 |
| 7,689,613 B2 * | 3/2010 | Candelore ................. | 707/707 |
| 2001/0029455 A1 * | 10/2001 | Chin et al. ................ | 704/277 |
| 2002/0169592 A1 * | 11/2002 | Aityan ..................... | 704/2 |
| 2005/0034079 A1 | 2/2005 | Gunasekar et al. | |
| 2007/0041370 A1 | 2/2007 | Cleveland | |
| 2007/0185956 A1 * | 8/2007 | Ogle et al. ................ | 709/204 |
| 2008/0233980 A1 * | 9/2008 | Englund et al. ............ | 455/466 |
| 2009/0210214 A1 * | 8/2009 | Qian et al. ................ | 704/2 |
| 2009/0254828 A1 | 10/2009 | Denoue et al. | |

OTHER PUBLICATIONS

Subramaniam et al. "A survey of types of text noise and techniques to handle noisy text". In Proc. of AND, Jul. 2009, pp. 115-122.*

* cited by examiner

*Primary Examiner* — James Wozniak
(74) *Attorney, Agent, or Firm* — Charles L. Moore; Moore & Van Allen PLLC

(57) ABSTRACT

A method for translating selected content in a web conference may include receiving, by a processing device, a selected area in an image from a shared application in a web conference. The selected area may contain text for translation into a chosen language. The method may also include performing an optical character recognition process on the text in the selected area of the image to provide OCR resulting text. The method may additionally include translating the OCR resulting text into the chosen language. The method may further include presenting the translated OCR resulting text in the chosen language to at least a translation requester in the web conference.

20 Claims, 4 Drawing Sheets

LANGUAGE TRANSLATION OF SELECTED CONTENT IN A WEB CONFERENCE

BACKGROUND

Aspects of the present invention relate to conferencing over a network or web conferencing, and more particularly to a method, system and computer program product for language translation of selected content in a web conference.

Web conferencing has become a widely used tool or application for holding meetings, particularly when meeting participants or attendees are located in different geographic locations. Participants can attend or participate in the meeting from their own office or other convenient location and do not have the expense and time involved in having to travel to a remote location. Thus, participants can be located in different countries around the world. As a result of this diversity of participants, demonstrations, presentations or applications that may be presented as part of a web conference with global participants may include images with text in different languages. To meaningfully participate in the web conference, a participant may desire to have a translation of selected text that may appear on the web conference screen or image.

BRIEF SUMMARY

According to one aspect of the present invention, a method for translating selected content in a web conference may include receiving, by a processing device, a selected area in an image from a shared application in a web conference. The selected area may contain text for translation into a chosen language. The method may also include performing an optical character recognition process on the text in the selected area of the image to provide OCR resulting text. The method may additionally include translating the OCR resulting text into the chosen language. The method may further include presenting the translated OCR resulting text in the chosen language to at least a translation requester in the web conference.

According to another aspect of the present invention, a system for translating selected content in a web conference may include a processing device for receiving a selected area in an image from a shared application in a web conference. The selected area may contain text for translation into a chosen language. The system may also include an optical character recognition module for performing optical character recognition on the text in the selected area of the image to provide OCR resulting text. The system may additionally include a language translator for translating the OCR resulting text into the chosen language and sending the translated OCR resulting text in the chosen language to at least a translation requester in the web conference.

According to a further aspect of the present invention, a computer program product for translating selected content in a web conference may include a computer readable storage medium having computer readable program code embodied therewith. The computer readable program code may include computer readable program code configured to receive a selected area in an image from a shared application in a web conference. The selected area may contain text for translation into a chosen language. The computer readable program code may also include computer readable program code configured to perform an optical character recognition process on the text in the selected area of the image to provide OCR resulting text. The computer readable program code may additionally include computer readable program code configured to translate the OCR resulting text into the chosen language. The computer readable program code may further include computer readable program code configured to present the translated OCR resulting text in the chosen language to at least a translation requester in the web conference.

BRIEF DESCRIPTION OF THE SEVERAL VIEWS OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION

Figure 1A:
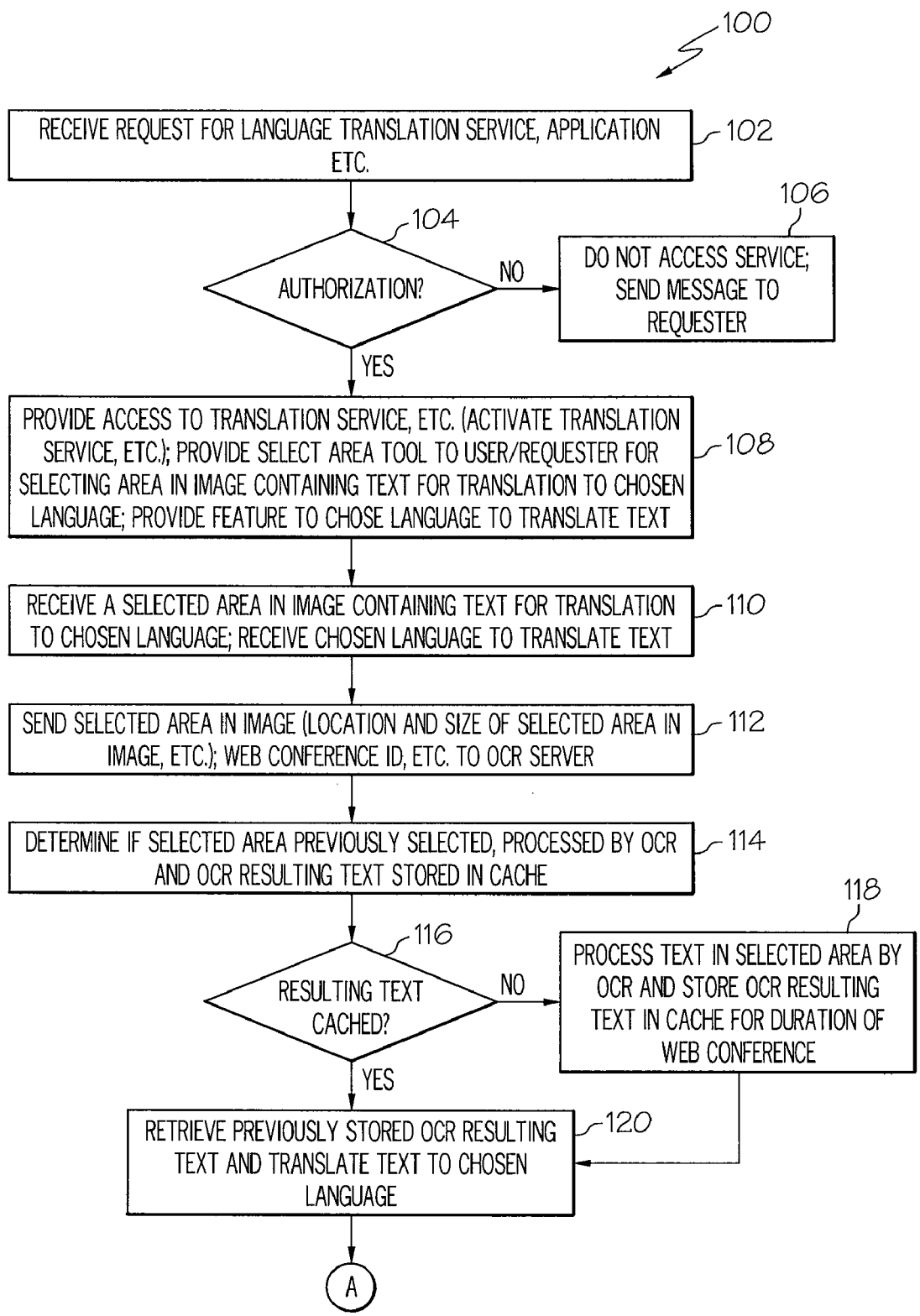
FIGS. 1A and 1B are a flowchart of an example of a method for translating selected content in a web conference in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1B:
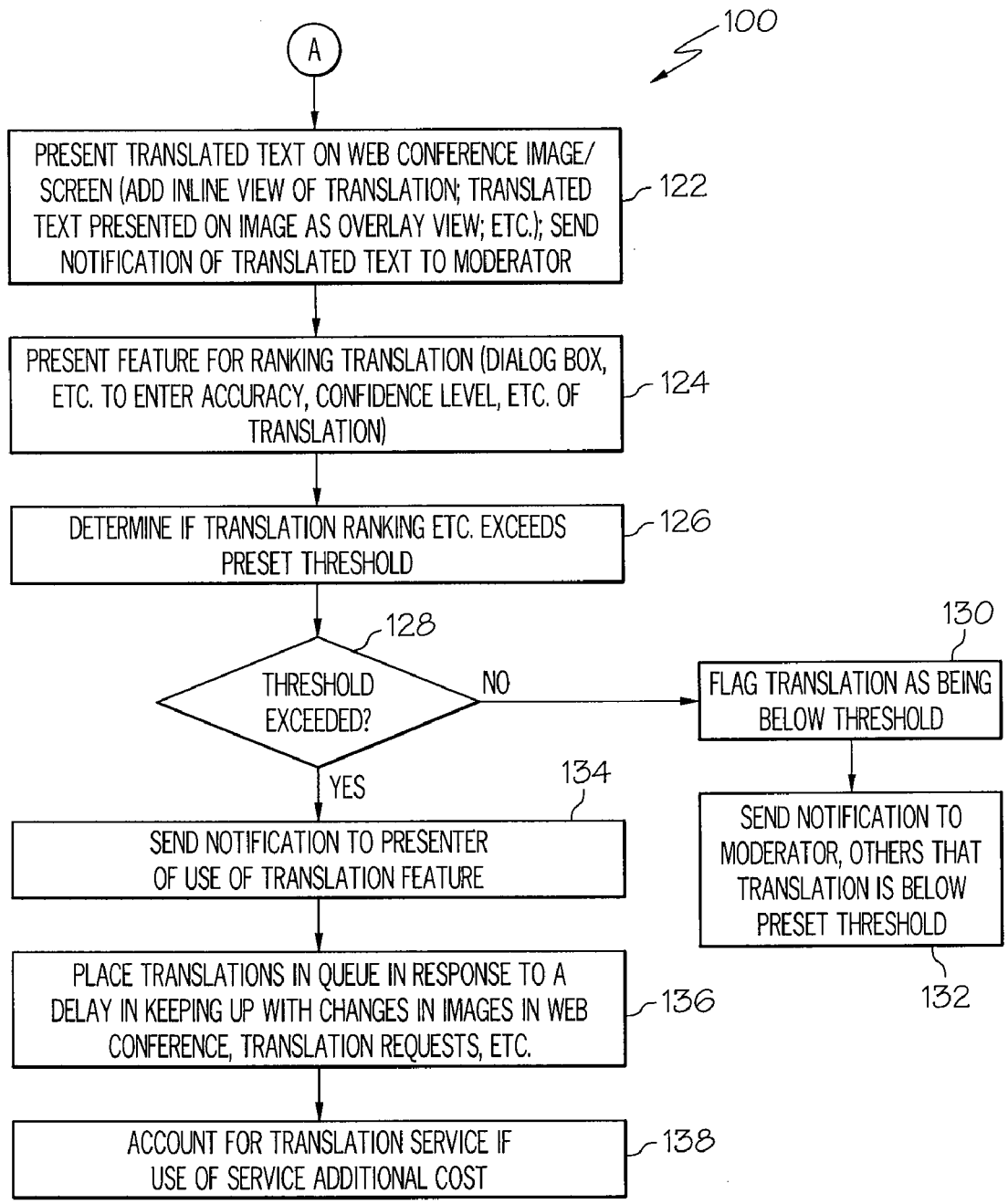

FIGS. 1A and 1B are a flowchart of an example of a method 100 for translating selected content in a web conference in accordance with an embodiment of the present invention. The selected content may be in a presentation which is being presented as part of the web conference. As used herein the presentation may be any type of presentation application or other application being used in a web conference in which a selected portion of the content of the presentation is desired to be translated into a chosen language by a user or one of the participants in the web conference.

In block 102, a request for a language translation service, application or similar function or operation may be received. In block 104, a determination may be made whether or the user or translation requester has authorization to use the translation service. If the translation requester does not have authorization, the method 100 may advance to block 106. In block 106, the requester may be denied access to the translation service and a message or notification may be sent to the requester that access is denied in response to the requester not being authorized to use the translation service.

If the user is authorized to use the translation service in block 104, the method 100 may advance to block 108. In block 108, the translation service may be activated and the user or translation requester may be provided access to the translation service. A select area tool or similar mechanism may be provided to the user or requester. The select area tool may permit the translation requester to select an area in an image from a shared application or presentation being presented on the web conference screen to the conference participants. The select area tool may be manipulated by the requester using a computer pointing device or other mechanism on a display of the requester's client computer system or other communications device that the requester may be using to participate in the web conference. The selected area may contain text for translation into a chosen language. An example of selecting an area in an image or screen of a web conference where the selected area contains text for translation will be described with reference to FIG. 2.

A feature may also be provided or presented to the requester to choose or enter a language into which the requester desires the text to be translated. The feature for choosing or entering the language may be a drop down menu, dialogue box or other arrangement for choosing or entering the language.

In block 110, the selected area in the image from the shared application containing the text for translation into the chosen language may be received. The selected area containing the text for translation may be received by a server, such as a web conferencing server or processing device. The language chosen by the requester into which the text is to be translated may also be received.

In block 112, the selected area containing the text may be sent to a server or other processing device for optical character recognition (OCR). An indication or identification of the web conference from which the selected area containing the text is being sent may also be sent. The selected area sent may include information related to the location and size of the selected area in the image and any other data or information that may be helpful in performing the optical character recognition process. In another embodiment, the optical character recognition may be performed on the same server as the server hosting the web conference.

In block 114, a determination may be made if the text contained in the selected area was previously selected and processed by OCR and OCR resulting text stored in a storage device or cache. If the text in the selected area was not previously processed by OCR and cached in block 116, the method 100 may advance to block 118. In block 118, the text in the selected area may be processed by OCR. The OCR resulting text may be stored in the storage device or cache for the duration of the web conference. The stored OCR resulting text may be used in the event another request is received for a translation of the same text into another language. The time needed to provide the translation may be substantially reduced by using the stored OCR resulting text and eliminating the need to OCR the text again.

If the selected area was previously selected and processed and the resulting text cached in block 116, the stored OCR resulting text may be retrieved from the cache and translated into the chosen language in block 120 chosen by the current translation requester.

In block 122, the translated OCR resulting text may be presented on the web conference image or screen. The translated OCR resulting text in the chosen language may be presented to at least the requester of the translation. The translated text may be presented by adding an in-line view of the translation. In another embodiment the translated text may be presented on the web conference image or screen as an overlay view. An example of presenting the translated text on the web conference image or screen will be described with reference to FIG. 2. A notification of the translated text may also be sent to the moderator of the web conference in block 122.

In block 124, a feature for ranking the translation by the requester or by the requester and other participants may be presented on the web conference image or screen. The ranking may be related to an accuracy, confidence level or other measure or opinion of the reliability of the translation. The feature for ranking the translation may include a dialogue box or other mechanism for entering the ranking, accuracy, confidence level or the like for the translation by the requester or by the requester and other web conference participants.

In block 126, a determination may be made if the translation ranking exceeds a preset threshold. If the preset threshold is not exceeded in block 128, the method 100 may advance to block 130. In block 130, the translation may be flagged as being below the threshold. Accordingly, the translation may be deemed by the requester or requester and other participants as being below a certain confidence level or not being that accurate or reliable and others need to be notified to this effect by some arrangement, such as flagging the translation or by other suitable means. In block 132, a notification may be sent to the moderator that the translation is below the preset threshold. In some embodiments, the notification that the translation is below the preset threshold may also be sent to other participants of the web conference.

If the preset threshold is not exceeded in block 128, the method 100 may advance to block 134. In block 134, a notification may be sent to the presenter, who is making the presentation from which the language translation was made, that a translation is being used. The use of the translation feature may be flashed to the presenter in a simple overlay or by other notification means. The overlay may be viewed by the presenter only. The notification may permit the presenter to clarify any misunderstandings based on the differences in language.

In block 136, translations or requests for translations may be placed in a queue in response to a delay in keeping up with changes in images or screens in the web conference.

In block 138, use of the translation service may be tracked or an accounting function performed. If use of the service may be an additional cost or there is a fee for use the service during a web conference the use of the service may be tracked.

Figure 2:
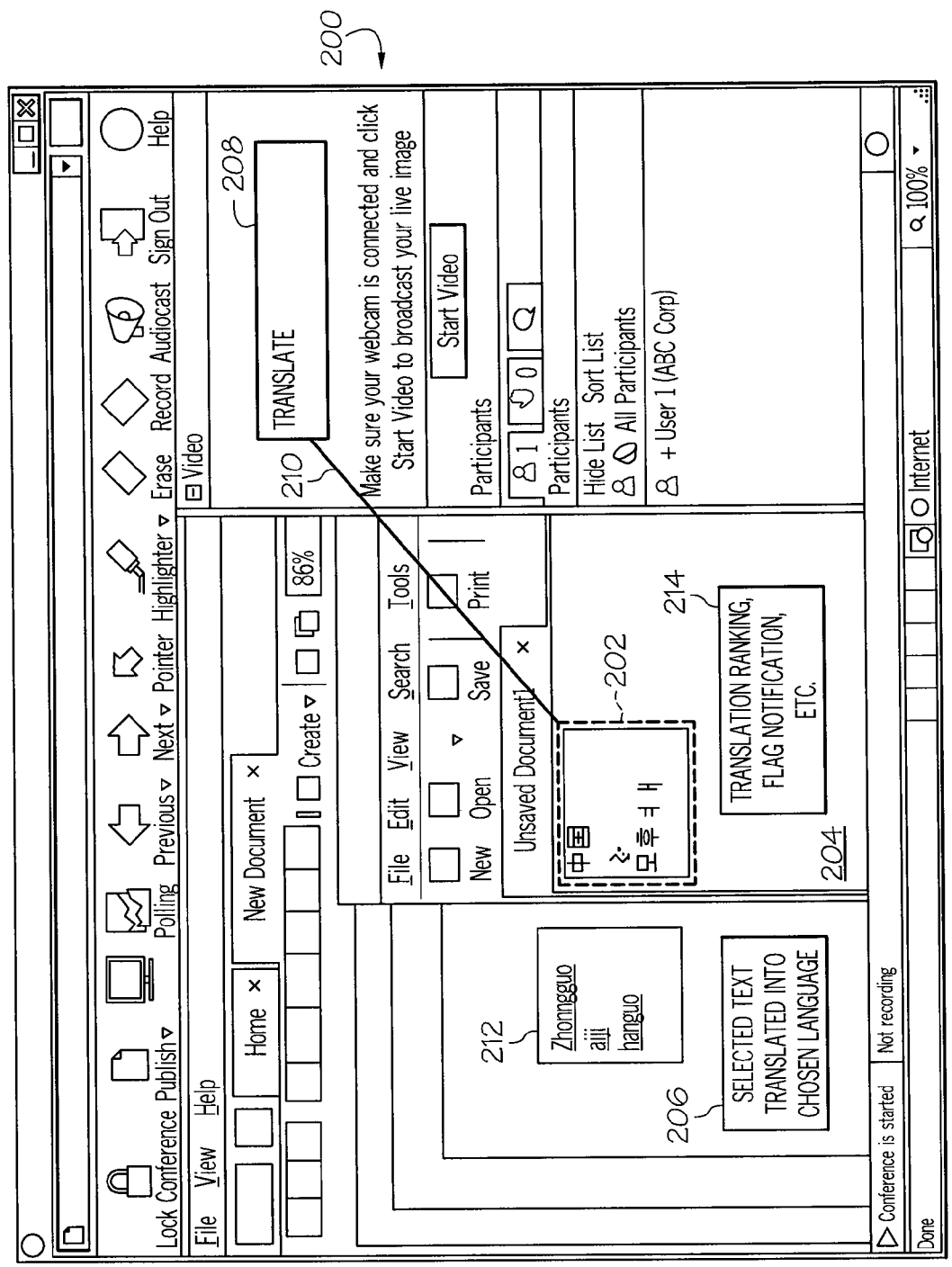
FIG. 2 is an example of a screen shot of a translation of selected content in a web conference in accordance with an embodiment of the present invention.

FIG. 2 is an example of a screen shot 200 of a translation of selected content in a web conference in accordance with an embodiment of the present invention. As previously described, a selection tool or similar device may be provided for selecting an area 202 in an image 204 of a web conference. The selection tool may be manipulated by a computer pointing device or other mechanism. The selected area 202 may contain text for translation into a chosen language similar to that previously described. The selected area 202 may be identified or otherwise highlighted in the screenshot 200 of the web conference. In the non-limiting example illustrated in FIG. 2, the selected area 202 may be bordered by a broken line that may have a predetermined color, such as red or some other high visibility color. The selected area 202, however, may be set off or otherwise distinguished from other portions of the image by any suitable arrangement to identify and distinguish the selected area 202.

A feature 206 for choosing the language by the user or translation requester into which the selected text will be translated may also be presented to the user or translation requester. The feature 206 may be a menu, drop down list or other mechanism for selecting an item in a graphical user interface.

The text in the selected area 202 may be translated into the chosen language as previously described and presented on the web conference screen 200. The translated text may be placed on the web conference screen 200 in an overlay image. For example, the translated text may be presented in a box 208 similar to that illustrated and FIG. 2. The box 208 may have a border of a predetermined color to set off or distinguish from other portions of the web conference screen 200 for quick and easy identification.

An association may be provided between each selected area 202 and the translated text 208. This feature maybe helpful if there are multiple selected areas and translations on a web conference screen. One non-limiting example of providing an association between each selected area 202 and the translated text 208, as illustrated in FIG. 2, may be a connecting line 210 extending between the translated text and the selected area 202 to illustrate that the box 208 contains the translation of the text contained in the selected area 202. Any sort of arrangement to depict the association between the translated text 208 and the associated selected area 202 containing the text which was translated may be used. For example, the selected area, translation box and connecting line therebetween may be a different color for each selected area and translation in a web conference screen.

If the text contained in the selected area 202 is in a language which uses characters other than standard Latin, such as Chinese characters, a phonetic pronunciation of the text contained in the selected area 202 may also be presented and identified on the web conference screen or image 200. In the example illustrated in FIG. 2, the phonetic pronunciation of the text contained in the selected area 202 may be presented in a box 212 adjacent to the selected area 202.

A feature 214 for ranking the translated text may also be presented on the web conference screen 200. Similar to that previously discussed, the ranking may be an indication of the accuracy, confidence level or reliability of the translation in the opinion of the translation requester or translation requester and other web conference participants. The feature 214 may include a menu, drop down list or other mechanism for the translation requester or other web conference participants to enter or select a ranking of the translated text. The translated text may be flagged in response to the ranking or accuracy of the translated text being below a preset threshold similar to that previously described.

Figure 3:
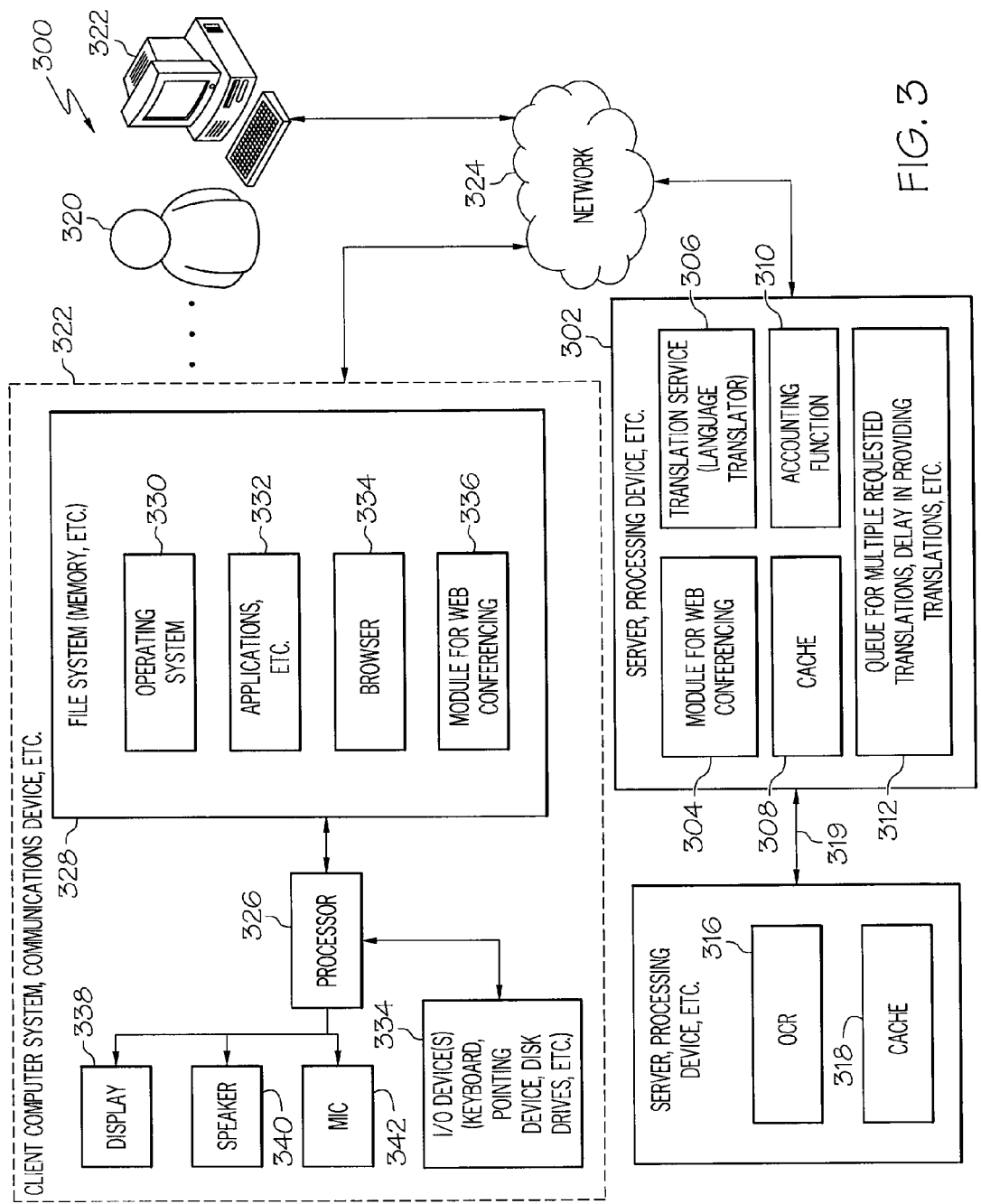
FIG. 3 is a block schematic diagram of an example of a system for translating selected content in a web conference in accordance with an embodiment of the present invention.

FIG. 3 is a block schematic diagram of an example of a system 300 for translating selected content in a web conference in accordance with an embodiment of the present invention. The method 100 of FIGS. 1A and 1B may be embodied in or performed by the system 300. The system 300 may include a server 302 or processing device. The server 302 may be a web conferencing server or similar processing device for hosting a web conferencing service. A module 304 for web conferencing may be operable on the server or web conferencing server 302 for providing the web conferencing services described herein. The module 304 may be stored on a file system of the web conferencing server 302.

The web conferencing server 302 may also include a translation service module 306. The translation service module 306 may perform all or a portion of the functions in method 100 described with reference to FIGS. 1A and 1B. Accordingly, the method 100 may be embodied in the translation service module 306. The translation service module 306 may include a language translator or language translator application adapted to translate the OCR resulting text into the chosen language similar to that described herein. Examples of a translation service, server, module or application may include but is not limited to IBM WebSphere Translation Server, Google Translate, Yahoo Babelfish or other translation services or applications. IBM, WebSphere and WebSphere Translation Server are trademarks of International Business Machines Corporation in the United States, other countries or both. Google and Google Translate are trademarks of Google, Inc. in the United States, other countries, or both. Yahoo and Yahoo Bablefish are trademarks of the Yahoo, Inc. in the United States, other countries or both.

The server 302 may also include a cache 308 or other storage device. The cache 308 may store OCR resulting text if the selected area was previously selected and the text container therein OCR'd. As previously discussed, if the selected area in the web conference image was previously selected and the text contained therein was previously processed by OCR, the stored OCR resulting text can be used if there is a request to translate the text contained in the selected area into other languages during the web conference. This will save time by eliminating the need to OCR the selected text each time a translation is requested in a different language.

The server 302 may also include an accounting function 310. The accounting function 310 may track or monitor and record use of the translation services for charging a fee for use of the service if this is an additional cost of the web conference.

The server 302 may also include a queue 312. The queue 312 may be used if there are multiple requested translations or there is a delay for some reason in providing the requested translations. For example, if web conference images are changing at a faster rate than the translations can be rendered, the queue 312 may be used to present the translation in the order requested or based on some other predetermined order.

In accordance with an aspect of the invention, the system 300 may include a server 314 or OCR server for performing the OCR function. In another embodiment the OCR function may be a feature or application on the web conferencing server 302. The OCR server 314 may include an OCR module 316. The OCR server 314 may also include a cache 318 or other storage device. The cache 318 may perform the same function as the cache 308 previously described. The cache 318 may be provided in place of the cache 308 or the cache 318 may not be needed if the cache 308 is provided in association with the web conferencing server 302. The web conferencing server 302 may communicate with the OCR server 314 via a communications link 319 or via a network 324.

A user or web conference participant 320 may use a computer system 322 to access the web conferencing server 302 via the network 324. The computer system 322 may be any type of communications device including mobile communications devices or the like capable of performing the functions or operations described herein. The network 324 may be the Internet, an intranet or other private or proprietary network.

The computer system 322 may include a processor 326 to control operation of the computer system 322. The computer system 322 may also include a file system 328, memory or similar data storage device in communication with the processor 326. An operating system 330, applications 332 and other programs may be stored on the file system 328 for running or operating on the processor 326. A web or Internet browser 334 may also be stored on the file system 328 for accessing the web conferencing server 302 via the network 324 for participating in web conferences.

A module for web conferencing 336 may also be stored on the file system 328 for operation on the processor 326. The module for web conferencing 336 may operate in association with the web conferencing server 302 to permit the user 320 to participate in web conferences and to be able to utilize the features and functions described herein.

The computer system 322 may also include a display 338 for presenting the content being shared or streamed by the web conferencing server 302. The computer system 322 may also include a speaker system 340 for receiving and presenting audio content from the web conferencing server 302 to the user 320. The computer system 322 may additionally include a microphone 342 for the user 210 to communicate with a moderator of each web conference and with other participants of each web conference and to make any presentation if the user 320 is a presenter in the web conference.

The computer system 322 may further include one or more input devices, output devices or combination input/output devices, collectively I/O devices 344. The I/O devices 344 may include a keyboard, pointing device, such as a mouse or other computer pointing device, disk drives and any other devices to permit a user, such as user 320, to interface with and control operation of the computer system 322 and to access the web conferencing server 302.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A method for translating selected content in a web conference, the method comprising:
    receiving, by a processing device, a selected area in an image from a shared application in a web conference, the selected area containing text for translation into a chosen language;
    performing an optical character recognition (OCR) process on the text in the selected area of the image to provide OCR resulting text;
    translating the OCR resulting text into the chosen language;
    presenting the translated OCR resulting text in the chosen language to at least a translation requester in the web conference;
    storing the OCR resulting text for translation into another chosen language in response to receiving a request for translating the OCR resulting text into the chosen language, eliminating a need to perform another OCR process and reducing time to present the OCR resulting text in the other chosen language, wherein the OCR resulting text is stored only for a duration of the web conference;
    presenting a feature for ranking the translated text, the ranking providing an indication of one of the accuracy, confidence level and reliability of the translation;
    determining if the ranking of the translated text is below a preset threshold; and
    sending a notification to at least a moderator of the web conference in response to the ranking being below the preset threshold.

2. The method of claim 1, further comprising determining if the translation requester is authorized to use a language translation service.

3. The method of claim 2, further comprising denying access to the translation language service and sending a notification to the translation requester that access is denied in response to the translation requester not being authorized to use the language translation service.

4. The method of claim 3, further comprising providing a select area tool for selecting the area in the image containing the text for translation in response to the translation requester being authorized to use the language translation service.

5. The method of claim 4, further comprising providing a feature for choosing the language into which the text is to be translated.

6. The method of claim 4, further comprising accounting for use of the language translation service for charging a fee for use of the service in response to the translation requester being authorized to use the translation language service.

7. The method of claim 1, further comprising determining if the text in the selected area was previously processed by optical character recognition and the OCR resulting text stored in a data storage device in response to receiving the selected area for performing the optical character recognition.

8. The method of claim 7, further comprising:
    retrieving the OCR resulting text from the data storage device in response to the text having been previously processed by the optical character recognition and stored in the data storage device; and
    translating the retrieved OCR resulting text into the other chosen language.

9. The method of claim 1, wherein performing the optical character recognition process on the text in the selected area of the image to provide the OCR resulting text is performed in response to the text in the selected area not having been previously processed by the optical character recognition process and stored in a storage device.

10. The method of claim 1, wherein presenting the translated OCR resulting text in the chosen language comprises presenting the translated OCR resulting text on a web conference screen displaying the image.

11. The method of claim 10, wherein the translated OCR resulting text is presented as an overlay on the image.

12. The method of claim 1, further comprising sending a notification of the translated OCR resulting text to a moderator of the web conference.

13. The method of claim 1, further comprising presenting a feature for ranking the translated text, the ranking providing an indication of one of the accuracy, confidence level and reliability of the translation.

14. The method of claim 13, further comprising:
    flagging the translated text in response to the ranking of the translated text being below a preset threshold; and
    presenting the ranking on a web conference screen.

15. The method of claim 1, further comprising displaying on a web conference screen an association between each selected area and its translated OCR resulting text in response to there being multiple selected areas and translations in the web conference.

16. A system for translating selected content in a web conference, the system comprising:
    a processing device for receiving a selected area in an image from a shared application in a web conference, the selected area containing text for translation into a chosen language;
    an optical character recognition module for performing optical character recognition on the text in the selected area of the image to provide OCR resulting text; and
    a language translator for translating the OCR resulting text into the chosen language and sending the translated OCR resulting text in the chosen language to at least a translation requester in the web conference;
    a cache for storing OCR resulting text for translation into another chosen language in response to a request for a translation in the chosen language, wherein the OCR resulting text is stored only for a duration of the web conference;

a module for presenting a feature for ranking the translated text, the ranking providing an indication of one of the accuracy, confidence level and reliability of the translation;

a module for determining if the ranking of the translated text is below a preset threshold; and a module for sending a notification to at least a moderator of the web conference in response to the ranking being below the preset threshold.

17. The system of claim 16, further comprising an OCR server for receiving the selected area in the image containing the text for translation from a web conferencing server.

18. The system of claim 16, further comprising a queue for providing a last language translation in response to a delay in keeping up with a change in images of the web conference.

19. A computer program product for translating selected content in a web conference, the computer program product comprising:

a tangible computer readable storage medium having computer readable program code embodied therewith, the computer readable program code comprising:

computer readable program code configured to receive a selected area in an image from a shared application in a web conference, the selected area containing text for translation into a chosen language;

computer readable program code configured to perform an optical character recognition process on the text in the selected area of the image to provide OCR resulting text;

computer readable program code configured to translate the OCR resulting text into the chosen language; and computer readable program code configured to present the translated OCR resulting text in the chosen language to at least a translation requester in the web conference; and computer readable program code configured to store the OCR resulting text for translation into another chosen language in response to receiving a request for translating the OCR resulting text into the chosen language, eliminating a need to perform another OCR process and reducing time to present the OCR resulting text in the other chosen language, wherein the OCR resulting text is stored only for a duration of the web conference;

computer readable program code configured to present a feature for ranking the translated text, the ranking providing an indication of one of the accuracy, confidence level and reliability of the translation;

computer readable program code configured to determine if the ranking of the translated text is below a preset threshold; and computer readable program code configured to send a notification to at least a moderator of the web conference in response to the ranking being below the preset threshold.

20. The computer program product of claim 19, wherein the computer readable program code further comprises:

computer readable program code configured to present a feature for ranking an accuracy of the translated text; and computer readable program code configured to flag the translated text in response to the accuracy of the translated text being below a preset threshold.

* * * * *